US005966150A

United States Patent [19]

Lester et al.

[11] Patent Number: 5,966,150

[45] Date of Patent: Oct. 12, 1999

[54] METHOD TO IMPROVE SOLID INK OUTPUT RESOLUTION

[75] Inventors: Audrey A. Lester, Sherwood; Steven V. Korol, Dundee; Stephen M. Kroon, Sherwood; C. Wayne Jaeger, Beaverton, all of Oreg.

[73] Assignee: Tektronix, Inc., Wilsonville, Oreg.

[21] Appl. No.: 08/968,778

[22] Filed: Nov. 10, 1997

Related U.S. Application Data

[63] Continuation-in-part of application No. 08/756,149, Nov. 27, 1996, Pat. No. 5,821,956.

[51] Int. Cl.$^{6}$ .................................. B41J 2/21; B41J 2/17; B41J 2/01; G01D 11/00

[52] U.S. Cl. .................................. 347/43; 347/98; 347/99; 347/105

[58] Field of Search .................................. 347/105, 43, 98, 347/99, 100; 428/216, 195, 704

[56] References Cited

U.S. PATENT DOCUMENTS

| | | | |
|---|---|---|---|
| 4,301,195 | 11/1981 | Mercer et al. | 427/261 |
| 4,529,650 | 7/1985 | Martinez | 428/336 |
| 4,555,437 | 11/1985 | Tanck | 428/212 |
| 4,592,954 | 6/1986 | Malhotra | 428/335 |
| 4,732,786 | 3/1988 | Patterson et al. | 427/261 |
| 4,745,420 | 5/1988 | Gerstenmaier | 346/25 |
| 4,801,473 | 1/1989 | Creagh et al. | 427/164 |
| 4,853,706 | 8/1989 | Van Brimer et al. | 346/25 |
| 4,873,134 | 10/1989 | Fulton et al. | 428/156 |
| 4,889,761 | 12/1989 | Titterington et al. | 428/195 |
| 4,992,304 | 2/1991 | Titterington | 427/164 |
| 5,110,665 | 5/1992 | Titterington et al. | 428/195 |
| 5,352,736 | 10/1994 | Stofke, Jr. et al. | 525/57 |
| 5,521,002 | 5/1996 | Sneed | 428/331 |
| 5,614,933 | 3/1997 | Hindmand et al. | 347/103 |
| 5,672,424 | 9/1997 | Malhotra et al. | 428/325 |
| 5,756,226 | 5/1998 | Valentini et al. | 428/704 |
| 5,821,956 | 10/1998 | Kroon et al. | 347/43 |

*Primary Examiner*—N. Le
*Assistant Examiner*—Thinh Nguyen
*Attorney, Agent, or Firm*—Ralph D'Alessandro

[57] ABSTRACT

A method of printing with phase change ink on an ink jet printer that contains multiple levels of black gray scale ink and a clear or slightly tinted wax ink base and which is applied to the roughened surface of an adhesion promoting coating applied to a transparent substrate is disclosed. The adhesion promoting coating has a surface roughness of greater than about 0.5 micrometers and contains a binder and an inorganic particulate material.

11 Claims, 3 Drawing Sheets

METHOD TO IMPROVE SOLID INK OUTPUT RESOLUTION

This is a continuation-in-part application of Ser. No. 08/756,149, filed Nov. 27, 1996 now U.S. Pat. No. 5,821,956 and assigned to the assignee of the present invention.

FIELD OF INVENTION

This invention relates generally to a method of printing using phase change ink and, more specifically, this invention relates to a method that increases the resolution and contrast on transparencies and achieves acceptable dynamic range of gray scale solid ink output.

BACKGROUND OF THE INVENTION

Solid or phase change inks that are solid at ambient temperatures and liquid at elevated operating temperatures employed in ink jet printers have been utilized for an extended period of time. These printers eject liquid phase ink droplets from the print head at an elevated operating temperature. The droplets solidify quickly upon contact with the surface of the receiving substrate to form a predetermined pattern.

Among the advantages of solid ink is the fact that it remains in a solid phase at room temperature during shipping and long-term storage. Problems with clogging in the print head are largely eliminated, or are less prevalent than occur with aqueous based ink jet print heads. The rapid solidification or hardening of the ink drops upon striking the receiving substrates permits high quality images to be printed on a wide variety of printing media.

It is known that printed images formed from deformation of solid inks on receiving substrates during or following the printing process is possible. For example, U.S. Pat. No. 4,745,420 to Gerstenmaier discloses a solid ink that is ejected onto a receiving substrate and subsequently spread by the application of pressure to increase the coverage and minimize the volume of ink required. This has been used in direct solid ink printing. Deformation of solid ink drops also has occurred in direct printing as disclosed in U.S. Pat. No. 5,092,235 to Rise, where a high pressure nip defined by a pair of rollers applies pressure to cold fuse solid ink drops to receiving substrates.

An indirect printing process has been successfully employed with solid ink drops to apply droplets of solid ink in a liquid phase in a predetermined pattern by a print head to a liquid intermediate transfer that is supported by a solid support surface, and then transfer the solid ink after it hardens from the liquid intermediate transfer surface to a final receiving surface. Some deformation of the ink drops occur in the transfer process, as is described in U.S. Pat. No. 5,372,852 to Titterington et al.

Solid ink printing on transparencies has its resolution of the final printed image affected by the amount of light transmitted through the base media, any coatings on the media and the ink itself. Transparency materials can have an increased dynamic range, which is the difference between the maximum and minimum density, when compared with reflection hard copy materials such as paper. In order to achieve improved transmissivity, the lowest density materials must transmit as much light as possible. To accomplish this, the base media has as few components as possible so that the scattering of light passing through the media is minimized and the maximum amount of light can be transmitted rectilinearly through the medium. Use of solid or phase change ink in ink jet printers to make transparencies is known as evidenced by U.S. Pat. Nos. 4,801,473; 4,889,761; and 4,853,706.

In addition to creating transparencies with rectilinear light transmission, solid ink printer manufacturers have had to ensure that the ink has strong adherence to the base material. Various adhesions promoting coating have been applied to transparency basis to improve the adhesion of the solid ink to the media. These coatings are typically rough-textured on their exposed surface to create more bonding sites for the solid ink upon solidification. U.S. Pat. Nos. 4,992,304 and 5,110,665 address the use of adhesion promoting coatings on transparent substrates.

With the recent innovation of using solid ink to perform medical diagnostic imaging using multiple gray scale levels of black ink, there has been increased attention to creating a compatible adhesion promoting coating with the standard Mylar film used in x-ray medical diagnostic imaging employing silver halide. In addressing the problem of creating maximum transmittance of light to achieve the necessary contrast and imaging quality on the transparencies when they are viewed on a light box, it was anticipated from prior experience that the highest transmittance would be where there was an absence of printed ink, or what has been called "white space." The only materials through which light would pass in these non-imaged areas would be through the transparent media and the compatible adhesion promoting coating. Surprisingly, however, it was discovered that the rough surface of the coating itself caused light to scatter and thus not pass rectilinearly through the combined substrate adhesion promoting coating on the surface to thereby decrease the amount of light transmitted to an unacceptable level. The deflected light in the "white" areas was bent and scattered into adjacent imaged areas with the ink further reducing the quality of the image and image contrast.

These problems are solved in the present invention by the use of a clear or slightly tinted or colored wax base that is applied over the adhesion promoting coating adjacent to the imaged areas in what would have been the unoccupied or "white" space. The clear or slightly tinted wax base has a refractive index that is substantially the same as the refractive index of the adhesion promoting coating and thereby prevents the scattering of light rays that would have occurred as the light passed from the transparent substrate through the adhesion promoting coating. The light rays pass in a generally rectilinearly path through the media substrate, the adhesion promoting coating, and the clear or slightly gray wax base.

SUMMARY OF THE INVENTION

It is an aspect of the present invention that clear or slightly tinted light wax base is applied only to the non-imaged or "white" space areas to prevent light rays from being scattered by the underlying adhesion promoting coating to ensure high resolution and contrast in the transparency output.

It is another aspect of the present invention that a high quality transparency is obtained that is usable in medical diagnostic imaging applications in place of the traditional silver halide x-ray film approach.

It is another aspect of the present invention that the pixels of clear or lightly tinted wax base applied in the non-imaged or white space areas are slightly lighter than the film coated with the adhesion promoting coating, thereby increasing the tonal scale of the output obtained from the multiple levels of black solid ink.

It is a feature of the present invention that a lightly tinted or a clear ink base is printed over an adhesion promoting coating that includes a binder and an inorganic particulate material in a predetermined pattern by a print head in a thin border several pixels deep, adjacent colored or gray scale ink drops in an area where unprinted white space would normally occur.

It is another feature of the present invention that the clear or lightly tinted wax ink base redirects what would normally be scattered or deflected rays that would have passed through the surface-roughened adhesion promoting coating to provide a generally rectilinear transmission or a transmission that follows Snell's law of refraction of light passing into the transparency substrate, through the adhesion promoting coating, and out of the clear or lightly tinted ink base.

It is yet another feature of the present invention that the refractive indices at the interface between the clear or slightly tinted wax ink base and the adhesion promoting coating that includes a binder and inorganic particulate material are substantially the same.

It is an advantage of the present invention that the method of printing by bordering gray scale ink drops with clear or lightly tinted ink drops in the non-imaged or normally white spaces prevents light scattering from the non-imaged areas into the imaged areas by not locally increasing the amount of light transmitted through the imaged areas, thereby making them paler.

It is another advantage of the present invention that the use of the clear or lightly tinted ink drops in the non-imaged areas prevents those areas from having a lower transmittance and less light passing through by effectively reducing scattering.

It is still a further advantage of the present invention that the addition of clear or lightly tinted wax ink drops on top of the adhesion promoting coating on the transparent substrate produces the surprising result of increasing light transmittance through the coated and imaged transparent substrate to achieve sharp gray scale edges with distinct lightness to darkness transitions.

It is yet another advantage in the present invention that the method is applicable to solid ink medical diagnostic image printing either in direct printing, or offset, or indirect printing processes.

These and other aspects, features, and advantages are obtained by a printing process employing the use of a clear or lightly tinted ink in the normally non-imaged or white spaces adjacent to the boundaries or edges of the solid ink image that is applied on top of the rough-surfaced adhesion promoting coating to achieve high resolution and gray scale solid ink output with excellent contrast between imaged and non-imaged areas with controlled dot gain suitable for medical diagnostic imaging applications where contrast and high resolution are critical.

BRIEF DESCRIPTION OF THE DRAWINGS

These and other aspects, features and advantages of the invention will become apparent upon consideration of the following detailed disclosure of the invention, especially when it is taken in conjunction with the accompanying drawings wherein.

DETAILED DESCRIPTION OF THE PREFERRED EMBODIMENT

It is to be understood that the instant invention can be employed equally well in direct solid ink printing directly on to the receiving surface/substrate or in indirect solid ink printing using an intermediate transfer surface. The following discussion will describe the process in the context of using an indirect printing process. It is also to be understood that the term imaged area as used in this specification means an area on the receiving substrate which has some level of black ink applied thereto and that the term non-imaged area means an area where no black ink is applied.

Figure 1:
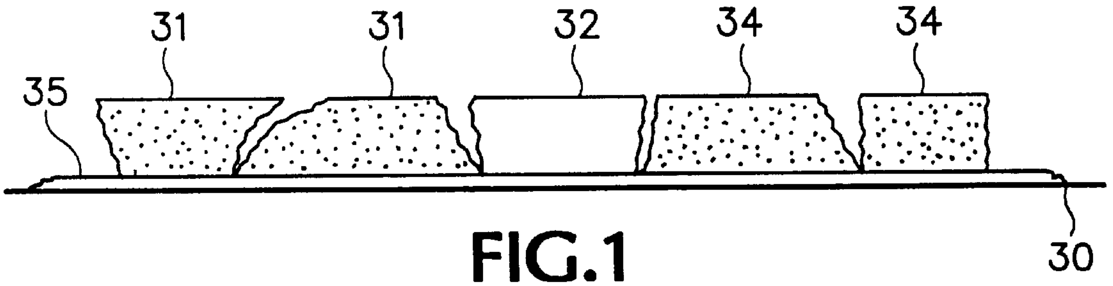
FIG. 1 is a diagrammatic illustration of the bordering of solid ink pixels by a clear or lightly tinted solid ink applied over an adhesion promoting coating on a transparent substrate to contain the solid ink pixels, prevent light scattering, and improve transmittance.
Figure 2:
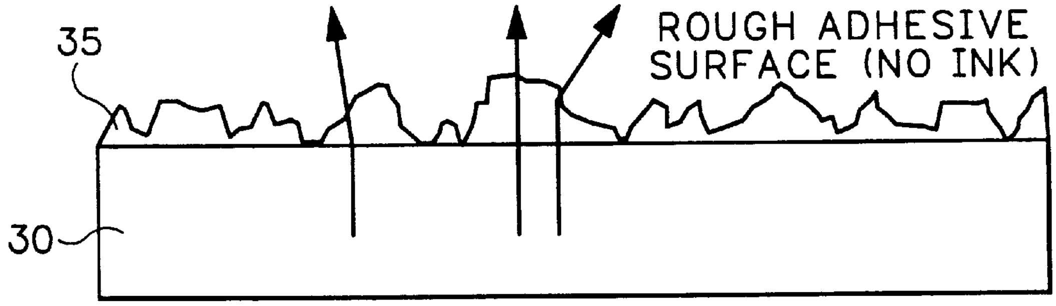
FIG. 2 is a diagrammatic illustration of light being scattered or deflected by the roughened surface of the adhesion promoting coating applied to a transparent substrate.
Figure 3:
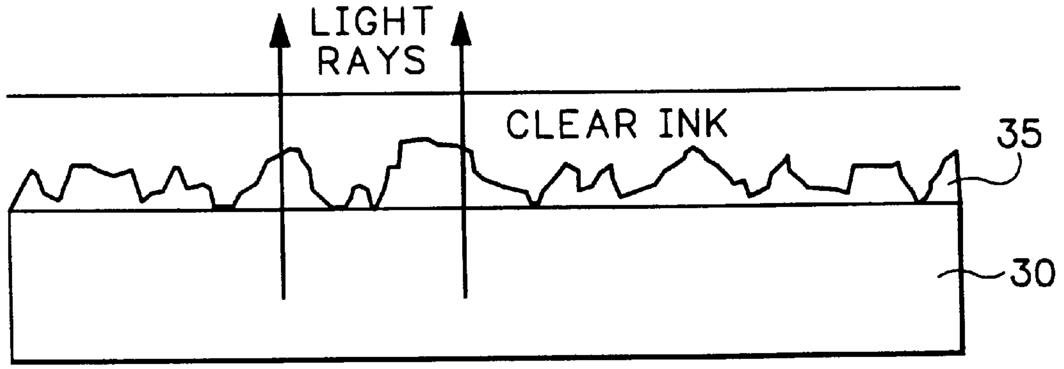
FIG. 3 is an enlarged diagrammatic illustration of light being passed rectilinearly through the layers of a transparent substrate, an adhesion promoting coating and a clear or lightly tinted wax ink base applied in the non-imaged or white space areas by an ink jet printer.
Figure 4:
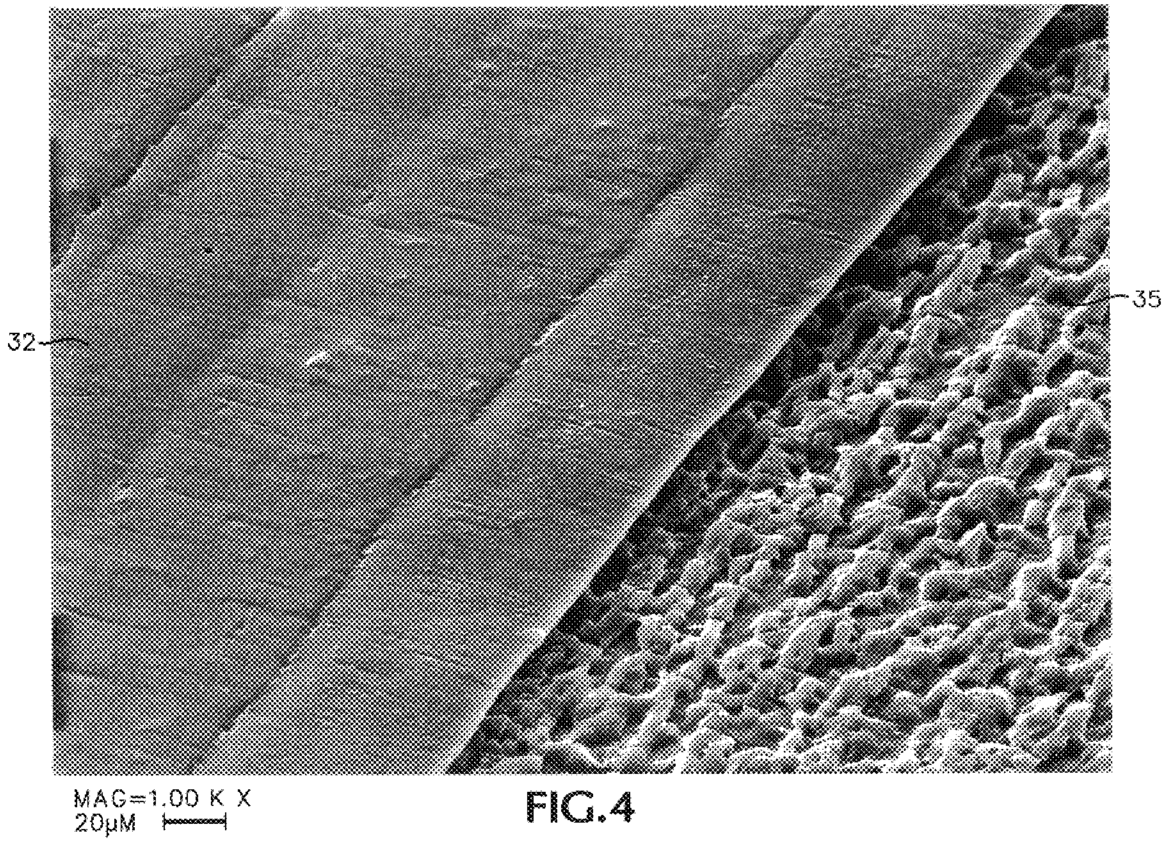
FIG. 4 is an enlarged scanning electron micrograph showing the actual roughened surface of the adhesion promoting coating and the layer of clear or slightly tinted wax ink base applied in the non-imaged or white space area of a transparency by an ink jet printer.

FIG. 1 discloses a diagrammatical illustration of the placement of ink drops on top of an adhesion promoting layer by an imaging apparatus utilized in the instant process to transfer an inked image from an intermediate transfer surface to a transparent final receiving substrate. The process is described in detail U.S. Pat. No. 5,614,933 to the assignee of the present invention. A print head in such an apparatus is supported by an appropriate housing and support elements for either stationary or moving utilization to place an ink in the liquid or molten state on a supporting intermediate transfer surface. The intermediate transfer surface is a liquid layer that is applied to the supporting surface, which is preferably a drum, but may also be a web, platen, or any other suitable design, by contact with an applicator, such as a metering blade, roller, web or the shown wicking pad contained within an appropriate applicator assembly.

Once the ink is applied to the transparent final receiving substrate it is fused or fixed to the surface of the final receiving surface so that the ink image is spread, flattened and adhered.

FIG. 1 shows in diagrammatic form, the placement of nonwhite solid ink drops 31 and 34 adjacent to what would be a white space or nonprinted ink space that is filled with a clear or fight gray drop 32. The ink drops 31, 32 and 34 are applied over the adhesion promoting coating 35 on the transparency substrate 30. The clear or lightly tinted drop 32 serves to contain the adjacent nonwhite solid ink drops 31 and 34 and prevent their spreading into what would have been the unprinted areas, as well as preventing light from being scattered from the non-imaged area into the imaged area with drops 31 and 34. The clear or light gray drops 32 may be employed one or more pixels deep along a boundary to contain an edge of solid ink drops to prevent their spreading into non-imaged or white spaces and to prevent light scattering across the entire breadth of transparent substrate 30.

This technique is especially helpful in gray scale printing for medical diagnostic imaging, where four different shades of blacks or grays, including the clear or lightly tinted wax base, are used in gray scale printing to obtain sharp contrast between imaged and non-imaged areas.

The ink utilized in the process and system of the instant invention is preferably initially in solid form and is then changed to a molten state by the application of heat energy to raise the temperature to about 85° C. to about 150° C. Elevated temperatures above this range will cause degradation or chemical breakdown of the ink. The molten ink is applied in raster fashion from the ink jets in a print head to the exposed surface of the liquid layer forming the intermediate transfer surface, where it is cooled to an intermediate temperature and solidifies to a malleable state in which it is transferred to the coated final transparent receiving surface 30 via a contact transfer by entering the nip between a roller and the liquid layer forming the intermediate transfer surface on the support surface or drum. This intermediate temperature where the ink is maintained in its malleable state is between about 30° C. to about 80° C.

Once the solid malleable ink image enters the nip, it is deformed to its final image conformation and adheres or is fixed to the final receiving substrate either by the pressure exerted against the ink image on the final receiving substrate 30 by the pressure roller alone, or by the combination of the pressure and heat supplied by appropriate heater means. The pressure exerted on the ink image is between about 10 to about 2000 pounds per square inch (psi), more preferably between about 500 to about 1000 psi, and most preferably between about 750 to about 850 psi. The pressure must be sufficient to have the ink image adhere to the final receiving substrate 30 and be sufficiently deformed to ensure that light is transmitted through the ink image rectilinearly or without deviation in its path from the inlet to the outlet, in those instances when the final receiving substrate is a transparency. Once adhered to the final receiving substrate 30, the ink image is cooled to ambient temperature of about 20–25 degrees Centigrade. The ink comprising the ink image must be ductile, or be able to yield or experience plastic deformation without fracture when kept at a temperature above the glass transition temperature. Below the glass transition temperature the ink is brittle. The temperature of the ink image in the ductile state is between about −10° C. and to about the melting point or less than about 85° C.

The liquid layer that forms the intermediate transfer surface on the surface of the transfer drum is heated by an appropriate heater device. The heater device may be a radiant resistance heater positioned internally within the transfer drum. Heater devices can also be employed in the paper or final receiving substrate guide apparatus and in the fusing and fixing roller, respectively. The heater device increases the temperature of the liquid intermediate transfer surface from ambient temperature to between about 25° C. to about 70° C. or higher. This temperature is dependent upon the exact nature of the liquid employed in liquid layer or intermediate transfer surface and the ink employed. A more preferred range is between about 30° C. to about 60° C., and a most preferred range is from about 45° C. to about 52° C. The heater device preheats the final receiving medium to between about 90° C. and about 100° C. However, the thermal energy of the receiving media is kept sufficiently low so as not to melt the ink upon transfer to the final receiving substrate.

The ink used to form the ink image preferably must have suitable specific properties for viscosity. Initially, the viscosity of the molten ink must be matched to the requirements of the ink jet device utilized to apply it to the intermediate transfer surface and optimized relative to other physical and theological properties of the ink as a solid, such as yield strength, hardness, elastic modulus, loss modulus, ratio of the loss modulus to the elastic modulus, and ductility. The viscosity of the phase change ink carrier composition has been measured on a Ferranti-Shirley Cone Plate Viscometer with a large cone. At about 140° C. a preferred viscosity of the phase change ink carrier composition is from about 5 to about 30 centipoise, more preferably from about 10 to about 20 centipoise, and most preferably from about 11 to about 15 centipoise. The surface tension of suitable inks is between about 23 and about 50 dynes/centimeter. Appropriate ink compositions are described in U.S. Pat. Nos. 4,889,560 issued Dec. 26, 1989, and 5,372,852 issued Dec. 13, 1994, both assigned to the assignee of the present invention. Alternate phase change ink compositions with which the invention may be employed also include those described in U.S. Pat. Nos. 5,560,765, issued Oct. 1, 1996; U.S. Pat. No. 5,259,873, issued Nov. 9, 1993; U.S. Pat. No. 4,390,360, issued Jun. 28, 1993; and U.S. Pat. No. 5,782,966 issued Jul. 21, 1988.

While any phase change ink composition can be employed to practice the present invention, a preferred ink has a composition of comprising a fatty amide-containing material employed as a phase change ink carrier composition and a compatible colorant. The fatty amide-containing material comprises a tetra-amide compound and a mono-amide compound. The phase change ink carrier composition is in a solid phase at ambient temperature and in a liquid phase at elevated operating temperature. The phase change ink carrier composition can comprise from about 10 to about 50 weight percent of a tetra-amine compound, from about 30 to about 80 weight percent of a secondary mono-amide compound, from about 0 to about 40 weight percent of a tackifier, from about 0 to about 25 weight percent of a plasticizer, and from about 0 to about 10 weight percent of a viscosity modifying agent. The dye loading to achieve the necessary gray scale levels of black and appropriate optical density is describing in detail in co-pending application 08/916,588, filed Aug. 22, 1997.

Any suitable adhesion promoting coating can be employed in the process of the present invention. For example, a coating of either an ethylene polymer or an ethylene and vinyl acetate copolymer or an ethylene and vinyl alcohol copolymer can be employed. The ethylene polymer or polyethylene must have a molecular weight between about 2,500 and about 10,000 and should preferably be oxidized to a substantial extent during manufacture. The copolymer is one of ethylene and vinyl acetate or an ethylene and vinyl alcohol copolymer, having between about 1% and about 30% vinyl acetate groups, an average molecular weight between about 2,500 and about 4,500 and should also be oxidized to a substantial extent during manufacture. Both the polyethylene and the ethylene vinyl acetate may be termed "waxlike". An ethylene vinyl acetate copolymer emulsion fitting the above description is available commercially from Carroll Scientific as WW-397 and has been found to work well. The coating is applied to a thickness of about 0.5 mils (12.7 microns) by either a Meyer rod draw-down technique or a reverse roll gravure method or any appropriate coating technique.

The preferred adhesion promoting coating comprises a binder and an inorganic particulate material. The binder comprises at least one water soluble polymer. The preferred water soluble polymers are chosen based on low ionic content and the presence of groups capable of adhering to silica. The water soluble polymer is most preferably chosen from polyvinyl alcohol, acrylates, hydrolyzed polyacrylamide, methyl cellulose, polyvinyl pyrrolidone, gelatin and copolymers thereof Copolymers and grafted polymers are suitable provided they are water soluble or water dispersable and dry to a clear coat. Particularly suitable copolymers and urethane/acrylate copolymers. More preferably, the binder comprises at least one polymer chosen from a group consisting of polyvinyl alcohol, polyvinyl pyrrolidone and gelatin. Most preferably, the binder comprises polymerized monomer chosen from vinyl alcohol, acrylamide, vinyl pyrrolidone and combinations thereof As discussed herein, the percentages of the adhesion promoting coating components will be presented based on the combined weight of the polymers and the inorganic particulate material only, unless otherwise stated.

The inorganic particulate material of the adhesion promoting coating represents at least 82 percent, by weight, and no more than 97 percent, by weight, of the total weight of the polymer and inorganic particulate material taken together. Above 97 percent, by weight, inorganic particulate material the scratch resistance of the film deteriorates to levels which are unacceptable for use in high quality printing. Below 82 percent by weight inorganic particulate material, the adhesion between phase change inks and the surface of the substrate, as measured by the tape test, decreases to levels which are unacceptable. Preferably the inorganic particulate material represents at least 89 percent and no more than 95 percent of the total weight of the polymer and inorganic particulate material taken together. Most preferably the inorganic particulate material represents 90–95 percent of the total weight of the polymer and inorganic particulate material taken together.

The inorganic particulate material is preferably chosen from a set consisting of colloidal silica and alumina. The preferred inorganic particulate material is colloidal silica with an average particle size of no more than 0.3 $\mu$m. The average particle size of the colloidal silica is preferably at least 0.005 $\mu$m. A particularly preferred colloidal silica is a multispherically coupled and/or branched form, also referred to as fibrous, branched silica. Specific examples include colloidal silica particles having a long chain structure in which spherical colloidal silica is coupled in a multispherically form, and the colloidal silica in which the coupled silica is branched. The coupled colloidal silica is obtained by forming particle-particle bonds between primary particles of spherical silica. The particle-particle bonds are formed with metallic ions having a valence of two or more interspersed between the primary particles of spherical silica. Preferred is a colloidal silica in which at least three particles are coupled together. More preferably, at least five particles are coupled together and most preferably at least seven particles are coupled together.

Average particle size is determined as the hydrodynamic particle size in water and is the size of a spherical particle with the same hydrodynamic properties as the sample in question. By way of example, a fibrous silica particle with actual dimensions on the order of 0.015 $\mu$m by 0.014 $\mu$m has a hydrodynamic particle size of approximately 0.035 $\mu$m.

The degree of ionization of silica plays an important role in the degree of ionization of the coating solution. The degree of ionization of the coating solution has been determined to play a major role in the clarity of the final media. The degree of ionization can be measured as the ionic strength of the coating formulation which is determined from the ionic conductivity of the coating solution prior to application on the support. Preferred is a total coating solution ionic conductivity of no more than 0.6 mS (Siemens×$10^3$) as measured at 25° C. at 10 percent, by weight, total solids, on a properly standardized EC Meter Model 19101-00 available from Cole-Parmer Instrument Company of Chicago, Ill., USA. More preferred is an ionic conductivity of no more than 0.5 mS, when measured at 25° C. at 10 percent, by weight, total solids. Most preferred is an ionic conductivity of no more than 0.3 mS, when measured at 25° C. at 10 percent, by weight, total solids.

The coating weight of the inorganic particulate material and the polymer is preferably at least 1 mg/dm$^2$ and no more than 15 mg/dm$^2$ per side. Above 15 mg/dm$^2$ the scratch resistance decreases to unacceptable levels for high quality printing. Below 1 mg/dm$^2$ phase change inks adhesion to the coating decreases to unacceptable levels and the coating quality diminishes requiring either decreased production rates or increases in the amount of unusable material both of which increase the cost of manufacture for the media. More preferably, the coating weight of the inorganic particulate material and the polymer is no more than 8 mg/dm$^2$ and most preferably the coating weight is no more than 5 mg/dm$^2$.

It is preferable to add a cross linker to the adhesion promoting coating to increase the strength of the dried coating. Preferred cross linkers are siloxane or silica silanols. Particularly suitable hardeners are defined by the formula, $R^1{}_nSi(OR^2)_{4-n}$ where $R^1$ is an alkyl, or substituted alkyl, of 1 to 18 carbons; $R^2$ is hydrogen, or an alkyl, or substituted alkyl, of 1 to 18 carbons; and n is an integer of 1 or 2. Aldehyde hardeners such as formaldehyde or glutaraldehyde are suitable hardeners. Pyridinium based hardeners such as those described in, for example, U.S. Pat. Nos. 3,880,665, 4,418,142, 4,063,952 and 4,014,862; imidazolium hardeners as defined in U.S. Pat. Nos. 5,459,029 and 5,378,842 are suitable for use in the present invention. Aziridenes and epoxides are also effective hardeners.

Crosslinking is well known in the art to form intermolecular bonds between various molecules and surfaces thereby forming a network. The adhesion promoting coating employed in the instant invention can have a crosslinker that may be chosen to form intermolecular bonds between pairs of water soluble polymers, between pairs of water insoluble polymers, or between water soluble polymers and water insoluble polymers. If crosslinking is applied it is most preferable to crosslink the polymers to the inorganic particulate matter. It is preferable to apply any crosslinking additive just prior to or during coating. It is contemplated that the crosslinking may occur prior to formation of the coating solution or in situ.

The term “gelatin” as used herein refers to the protein substances which are derived from collagen. In the context of the present invention “gelatin” also refers to substantially equivalent substances such as synthetic derivatives of gelatin. Generally, gelatin is classified as alkaline gelatin, acidic gelatin or enzymatic gelatin. Alkaline gelatin is obtained from the treatment of collagen with a base such as calcium hydroxide, for example. Acidic gelatin is that which is obtained from the treatment of collagen in acid such as, for example, hydrochloric acid. Enzymatic gelatin is generated by a hydrolase treatment of collagen. The teachings of the present invention are not restricted to gelatin type or the molecular weight of the gelatin. Carboxyl-containing and amine containing polymers, or copolymers, can be modified to lessen water absorption without degrading the desirable properties associated with such polymers and copolymers.

Other materials can be added to the receptive layer to aid in coating and to alter the rheological properties of either the coating solution or the dried layer. Polymethylmethacrylate beads can be added to assist with transport through phase change ink printers. Care must be taken to ensure that the amount of beads is maintained at a low enough level to ensure that adhesion of the phase change ink to the substrate and the high clarity is not deteriorated. It is conventional to add surfactants to a coating solution to improve the coating quality. Surfactants and conventional coating aids are compatible with the present invention.

The preferred support is a polyester obtained from the condensation polymerization of a diol and a dicarboxylic acid. Preferred dicarboxylic acids include terephthalate acid, isophthalic acid, phthalic acid, naphthalenedicarboxylic acid, adipic acid and sebacic acid. Preferred diols include ethylene glycol, trimethylene glycol, tetramethylene glycol and cyclohexanedimethanol. Specific polyesters suitable for use in the present invention are polyethylene terephthalate, polyethylene-p-hydroxybenzoate, poly-1, 4-cyclohexylene dimethylene terephthalate, and polyethylene-2, 6-naphthalenecarboyxlate. Polyethylene terephthalate is the most preferred polyester for the support due to superior water resistance, chemical resistance and durability. The polyester support is preferably 1–10 mil in thickness. More preferably the polyester support is 3–8 mil thick and most preferably the polyester support is either 3.5–4.5 mil or 6–8 mil thick.

A prime layer is typically applied, and dry-cured during the manufacture of the polyester support. When polyethyene terephthalate is manufactured for use as a photographic support, the polymer is cast as a film, the mixed polymer primer layer composition is applied to one or both sides and the structure which is then biaxially stretched. The biaxial stretching is optionally followed by coating of a gelatin subbing layer. Upon completion of stretching and the application of the subbing layer compositions, it is necessary to remove strain and tension in the support by a heat treatment comparable to the annealing of glass. Air temperatures of from 100° C. to 160° C. are typically used for this heat treatment.

It is preferred to activate the surface of the support prior to coating to improve the coating quality thereon. The activation can be accomplished by corona-discharge, glow-discharge, UV-rays or flame treatment. Corona-discharge is preferred and can be carried out to apply an energy of 1 mw to 1 kw/$m^2$. More preferred is an energy of 0.1 w to 5 w/$m^2$.

Bactericides may be added to any of the described layers to prevent bacteria growth. Preferred are Kathone®, neomycin sulfate, and others as known in the art.

An optional, but preferred backing layer can be added to decrease curl, impart color, assist in transport, and other properties as common to the art. Aforementioned antistatic layers are suitable as backing layers. The backing layer may comprise cross linkers to assist in the formation of a stronger matrix. Preferred cross linkers are carboxyl activating agents as defined in Weatherill, U.S. Pat. No. 5,391,477. Most preferred are imidazolium hardeners as defined in Fodor, et al., U.S. Pat. No. 5,459,029; and U.S. Pat. No. 5,378,842. The backing layer may also comprise transport beads such as polymethylmethacrylate. It is known in the art to add various surfactants to improve coating quality. Such teachings are relevant to the backing layer of the present invention.

The adhesion promoting coating for use in the present invention can be prepared from a polymer solution in a jacketed, stirred container at about 7–8% by weight. The polymer, which is typically available as a powder, is dispersed at moderately high shear in deionized water for a short duration. The shear is decreased and the temperature raised to above 90° C. and maintained at this temperature for about a one half hour until the polymer is completely dissolved. The solution is then cooled to about 25 to about 30° C. and the percent by weight of the solids is determined. The pH is adjusted to closely approximate that of the inorganic silica particulate material. Coating aids such as Triton X-100, ethyl alcohol, antimicrobials, Teflon polytetrafluoroethylene beads and other additives are added as desired. The solution containing the silica inorganic particulate matter is prepared in a second stirred container. The polymer solution and the silica inorganic particulate matter are then combined and analyzed to insure that the pH and viscosity are suitable for coating. The mixtures are coated on the transparent polyester film substrate within 24 hours of preparation. The percentage of silica by weight can vary from about 87% to about 97% as a fraction of the total weight of silica and polymer. Suitable silicas include Ludox CL, Ludox SK, Ludox SKB, Ludox TM-50, Ludox LS and Ludox TMA all available from E. I. DuPont deNemours & Co. of Wilmington, Del. Snowtex-OUP is another appropriate silica available commercially from Nissan Chemical Industry, Ltd of Tokyo, Japan. The adhesion promoting coating is applied to the transparent substrate in ranges form about 0.8 to about 1.65 $\mu$m calculated assuming a dry solids density of about 2.0 gm/cc.

Light travelling through the transparent polyester support or substrate, the adhesion promoting coating and the ink forming the medical diagnostic image is subject to the effects of Snell's Law of Refraction at the interfaces of each layer of material. The ratio of sin $\alpha$/sin $\beta$ is the relative refractive index of the second medium with respect to the first $n_2/n_1$. The law can be expressed as sin $\alpha$/sin $\beta = n_2/n_1$. The refractive indices at the interface of the adhesion promoting coating and the ink layers are substantially the same. A critical component of the present invention is the realization that adhesion promoting coatings on transparent substrates with surfaces having a root mean square (RMS) surface roughness ($N_q$) greater than about 0.5 micrometers ($N_q \geqq 0.5$) will scatter light sufficiently to not permit the resulting film to be used for transparency purposes in medical diagnostic imaging because insufficient light is transmitted through the coated film. The preferred adhesion promoting coating comprising the binder and the inorganic silica particulate material has a RMS surface roughness ($R_q$) measured by a Mitutoyo Surftest SV-502 profilometer on a 8 ½ by 11 inch polyester film support of from about 1.28 to about 1.36 micrometers measured at each of the four corners and at the center in orthogonally opposed scanning directions. The direction of scanning had no effect on the surface roughness. The Mitutoyo profilometer was calibrated to a range of 600 micrometers ($\mu$m), a scanning speed of 0.5 mm/sec using a cutoff length of 0.8 mm and a Gaussian filter, and a total evaluation length of 50 mm. The uncoated transparent film substrate had a surface roughness ($R_q$) of about 0.02 $\mu$m, while the adhesion promoting coated transparent substrate when printed with clear or slightly tinted wax ink base had a surface roughness ($R_q$) ranging from about 0.27 to about 0.34 $\mu$m when measured in the same manner as the original coated transparent substrate.

The following examples are illustrative of the phase change ink formulations that can be successfully employed both with and without a liquid intermediate transfer surface to an adhesion promoting coating on a polyester support film, without any intent to limit the invention to the specific materials, process or structure employed. All parts and percentages are by weight unless explicitly stated otherwise.

EXAMPLE 1

A plasticizer[1] (722 grams) and molten stearyl stearamide[2] (3746 grams, and an antioxidant[3] (16.00 grams) were added (in that order) to a pre-heated 110° C. stainless steel container. The components were then mixed with a propeller mixer and a rosin ester resin[4] (1781.92 grams) was slowly added to the mixture over 20 minutes, maintaining a mixture temperature of at least 100° C. A dimer acid-based tetra-amide[5] (1509.84 grams) was then added to the mixture over 15 minutes, while also maintaining a minimum mixture temperature of 100° C. The blend was allowed to mix for 1 hour until all the tetra-amide had dissolved. At this point, an orange dye[6] (16.08 grams) and a black dye[7] (208.01 grams) were added and allowed to mix for approximately 2 hours. The ink was then passed through a 2.0 micron filter (Pall Filter P/N PFY1U2-20ZJ, S/N 416) under approximately 5 psi of nitrogen pressure.

[1] SANTICIZER 278, phthalate ester plasticizer manufactured by Monsanto Polymer Products Co. of St. Louis, Mo.
[2] KEMAMIDE S-180, stearyl stearamide manufactured by Witco Chemical Company of Memphis, Tenn.
[3] NAUGARD 445, antioxidant manufactured by Uniroyal Chemical Company of Middlebury, Conn.
[4] KE-100, glycerol ester of hydrogenated abietic (rosin) acid manufactured by Arakawa Chemical Industries Inc. of Osaka, Japan
[5] UNIREZ 2970, manufactured by Union Camp Corporation of Wayne, N.J.
[6] DISPERSE ORANGE 47 dye, commercially available from Keystone Aniline Corporation of Chicago, Ill.
[7] SOLVENT BLACK 45 dye, commercially available from Clariant Corporation of Charlotte, N.C.

Figure 5:
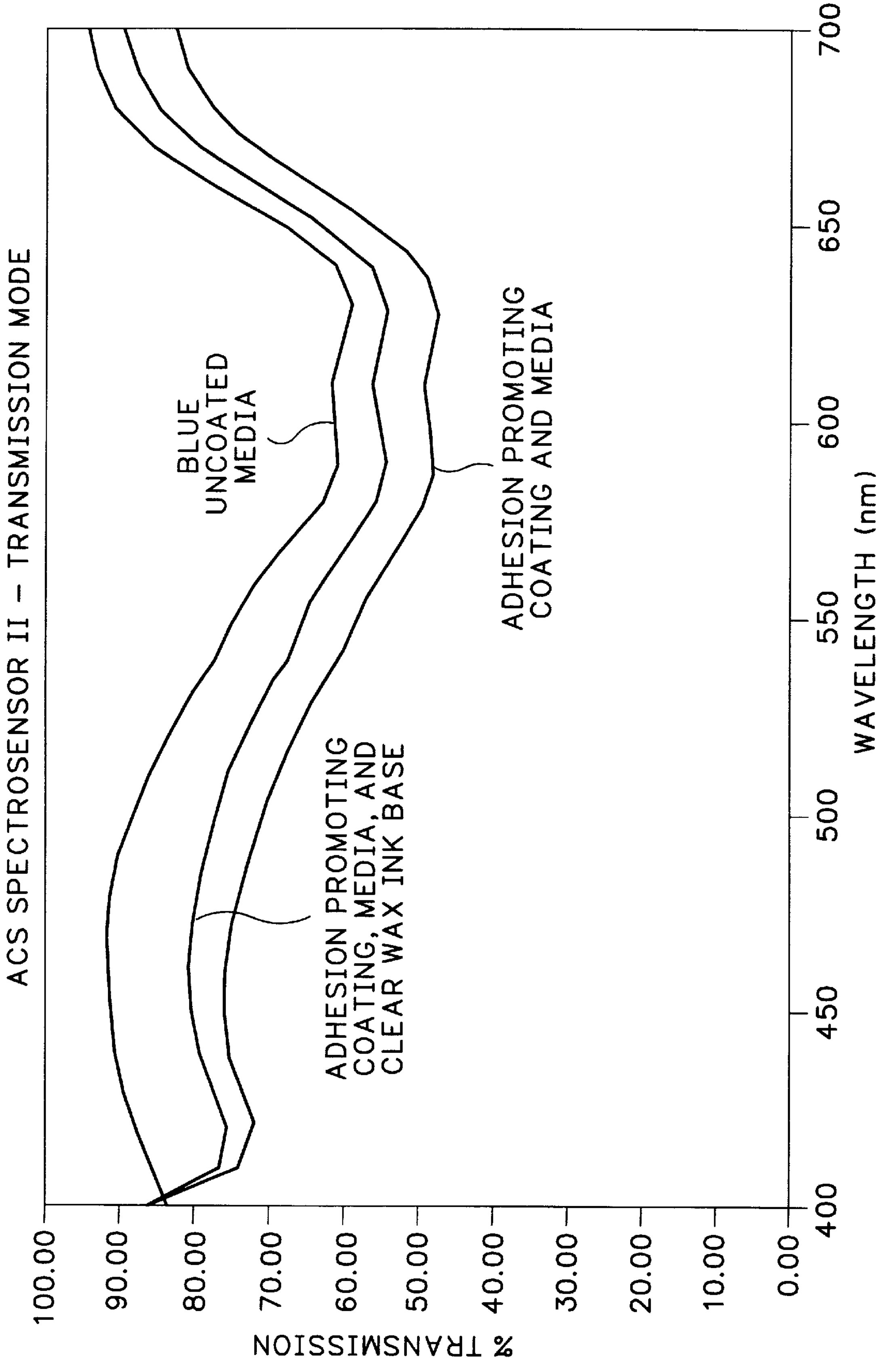
FIG. 5 is a graphical illustration of the decreased transmittance of a transparent substrate coated with the adhesion promoting coating versus the transmittance of the transparent substrate coated with the adhesion promoting coating and a layer of clear or slightly tinted solid ink applied over the adhesion promoting coating in the non-imaged or white spaces, as well as the transmittance of just a transparent substrate.

A sample of this product was tested for spectral strength and the results are illustrated in FIG. 5. It was found to have 2.60% black dye and 0.197% orange dye in the filtered product. The viscosity of the ink was found to be 12.89 centipoise at 140° C. measured with a Bohlin Model CS-50 Rheometer using a cup and bob geometry. The ratio of absorbance at the 475 nanometer region to the 580 nanometer region for this ink was 0.978:1. Dynamic mechanical analyses (DMA) were used on a Rheometrics Solids Analyzer (RSA II) manufactured by Rheometrics, Inc. of Piscataway, N.J. using a dual cantilever beam geometry to determine the following physical properties: glass transition temperature ($T_g$)=10.8° C.; storage modulus E'=$2.5\times10^9$ dynes/cm$^2$ at 25° C. and $1.5\times10^9$ dynes/cm$^2$ at 50° C.; the integral of log tan δ was 25.4 from about −40° C. to about 40° C. The ink displayed a phase change transition of about 90° C. by the technique of differential scanning calorimetry (DSC) using a TA Instrument DSC 2910 Modulated DSC.

EXAMPLE 2

A plasticizer[1] (217.5 grams) and molten stearyl stearamide[2] (1382.9 grams), and an antioxidant[3] (5.4 grams) were added (in that order) to a pre-heated 110° C. stainless steel container. The components were then mixed with a propeller mixer and a rosin ester resin[4] (579.3 grams) was slowly added to the mixture over 20 minutes, maintaining a mixture temperature of at least 100° C. A dimer acid-based tetra-amide[5] (516.5 grams) was then added to the mixture over 15 minutes, while also maintaining a minimum mixture temperature of 100° C. The blend was allowed to mix for 1 hour until all the tetra-amide had dissolved. At this point, an orange dye[6] (6.8 grams) and a black dye[7] (88.4 grams) were added and allowed to mix for approximately 2 hours. The ink was then passed through a 2.0 micron filter (Pall Filter P/N PFY1U2-20ZJ, S/N 416) under approximately 5 psi of nitrogen pressure.

[1] SANTICIZER 278, phthalate ester plasticizer manufactured by Monsanto Polymer Products Co. of St. Louis, Mo.
[2] KEMAMIDE S-180, stearyl stearamide manufactured by Witco Chemical Company of Memphis, Tenn.
[3] NAUGARD 445, antioxidant manufactured by Uniroyal Chemical Company of Middlebury, Conn.
[4] KE-100, glycerol ester of hydrogenated abietic (rosin) acid manufacturedby Arakawa Chemical Industries Inc. of Osaka, Japan
[5] UNIREZ 2970, manufactured by Union Camp Corporation of Wayne, N.J.
[6] DISPERSE ORANGE 47 dye, commercially available from Keystone Aniline Corporation of Chicago, Ill.
[7] SOLVENT BLACK 45 dye, commercially available from Clariant Corporation of Charlotte, N.C.

A sample of this product was tested for spectral strength. It was found to have 3.081% black dye and 0.227% orange dye in the filtered product. The ratio by weight of the orange dye to the black dye was 0.074 to 1.0. The viscosity of the ink was found to be 12.88 centipoise at 140° C. measured with a Bohlim Model CS-50 Rheometer using a cup and bob geometry. The ratio of absorbance at the 475 nanometer region to the 580 nanometer region for this ink was 0.970:1. Dynamic mechanical analyses (DMA) were used on a Rheometrics Solids Analyzer (RSA II) manufactured by Rheometrics, Inc. of Piscataway, N.J. using a dual cantilever beam geometry to determine the following physical properties: glass transition temperature ($T_g$)=10.8° C.; storage modulus E'=$2.3\times10^9$ dynes/cm$^2$ at 25° C. and $1.4\times10^9$ dynes/cm$^2$ at 50° C.; the integral of log tan δ was 25.2 from about −40° C. to about 40° C. The ink displayed a phase change transition of about 90° C. by the technique of differential scanning calorimetry (DSC) using a TA Instrument DSC 2910 Modulated DSC.

EXAMPLE 3

A plasticizer[1] (226.8 grams) and molten stearyl stearamide[2] (1229.7 grams), and an antioxidant[3] (5.4 grams) were added (in that order) to a pre-heated 110° C. stainless steel container. The components were then mixed with a propeller mixer and a rosin ester resin[4] (668.6 grams) was slowly added to the mixture over 20 minutes, maintaining a mixture temperature of at least 100° C. A dimer acid-based tetra-amide[5] (567.8 grams) was then added to the mixture over 15 minutes, while also maintaining a minimum mixture temperature of 100° C. The blend was allowed to mix for 1 hour until all the tetra-amide had dissolved. At this point, an orange dye[6] (2.5 grams) and a black dye[7] (33.0 grams) were added and allowed to mix for approximately 2 hours. The ink was then passed through a 2.0 micron filter (Pall Filter P/N PFY1U2-20ZJ, S/N 416) under approximately 5 psi of nitrogen pressure.

[1] SANTICIZER 278, phthalate ester plasticizer manufactured by Monsanto Polymer Products Co. of St. Louis, Mo.
[2] KEMAMIDE S-180, stearyl stearamide manufactured by Witco Chemical Company of Memphis, Tenn.
[3] NAUGARD 445, antioxidant manufactured by Uniroyal Chemical Company of Middlebury, Conn.
[4] KE-100, glycerol ester of hydrogenated abictic (rosin) acid manufactured by Arakawa Chemical Industries Inc. of Osaka, Japan
[5] UNIREZ 2970, manufactured by Union Camp Corporation of Wayne, N.J.
[6] DISPERSE ORANGE 47 dye, commercially available from Keystone Aniline Corporation of Chicago, Ill.
[7] SOLVENT BLACK 45 dye, commercially available from Clariant Corporation of Charlotte, N.C.

A sample of this product was tested for spectral strength. It was found to have 1.21% black dye and 0.086% orange dye in the filtered product. The ratio by weight of the orange dye to the black dye was 0.071 to 1.0. The viscosity of the ink was found to be 12.78 centipoise at 140° C. measured in a Bohlin Model CS-50 Rheometer using a cup and bob geometry. The ratio of absorbance at the 475 nanometer region to the 580 nanometer region for this ink was 0.957:1. Dynamic mechanical analyses (DMA)were used on a Rheometrics Solids Analyzer (RSA II) manufactured by Rheometrics, Inc. of Piscataway, N.J. using a dual cantilever beam geometry to determine the following physical properties: glass transition temperature ($T_g$)=9.0° C.; storage modulus E'=2.3×$10^9$ dynes/$cm^2$ at 25° C. and 1.2×$10^9$ dynes/$cm^2$ at 50° C.; the integral of log tan δ was 27.6 from about −40° C. to about 40° C. The ink displayed a phase change transition of about 92° C. by the technique of differential scanning calorimetry (DSC) using a TA Instrument DSC 2910 Modulated DSC.

EXAMPLE 4

A plasticizer[1] (212.5 grams) an d molten stearyl stearamide[2] (180.2 grams), and an antioxidant[3] (5.4 grams) were added (in that order) to a pre-heated 110° C. stainless steel container. The components were then mixed with a propeller mixer and rosin ester resin[4] (689.0 grams) was slowly a dded to the mixture over 20 minutes, maintaining a mixture temperature of at least 110° C. A dimer acid-based tetra-amided[5] (614.8 grams) was then added to the mixture over 15 minutes, while also maintaining a minimum mixture temperature of 100° C. The blend was allowed to mix for 1 hour until all the tetra-amide had dissolved. At this point, an orange dye[6] (0.9 grams) and a black dye[7] (11.1 grams) were added and allowed to mix for approximately 2 hours. The ink was then passed through a 2.0 micron filter (Pall Filter P/N PFY1U2-20ZJ, S/N 416) under a pproximately 5 psi of nitrogen pressure.

[1] SANTICIZER 278, phthalate ester plasticizer manufactured by Monsanto Polymer Products Co. of St. Louis, Mo.
[2] KEMAMIDE S-180, steatyl stearamide manufactured by Witco Chemical Company of Memphis, Tenn.
[3] NAUGARD 445, antioxidant manufactured by Uniroyal Chemical Company of Middlebury, Conn.
[4] KE-100, glycerol ester of hydrogenated abietic (rosin) acid manufactured by Arakawa Chemcal Industries Inc. of Osaka, Japan
[5] UNIREZ 2970, manufactured by Union Camp Corporation of Wayne, N.J.
[6] DISPERSE ORANGE 47 dye, commercially available from Keystone Aniline Corporation of Chicago, Ill.
[7] SOLVENT BLACK 45 dye, commercially available from Clariant Corporation of Charlotte, N.C.

A sample of this product was tested for spectral strength. It was found to have 0.42% black dye and 0.032% orange dye in the filtered product. The ratio by weight of the orange dye to the black dye was 0.076 to 1.0. The viscosity of the ink was found to be 12.83 centipoise at 140° C. measured with a Bohlin Model CS-50 Rheometer using a cup and bob geometry. The ratio of absorbance at the 475 nanometer region to the 580 nanometer region for this ink was 0.983:1. Dynamic mechanical analyses (DMA) were used on a Rheomettics Solids Analyzer (RSA II) manufactured by Rheometrics, Inc. of Piscataway, N.J. using a dual cantilever beam geometry to determine the following physical properties: glass transition temperature ($T_g$)=9.5° C.; storage modulus E'=2.3×$10^9$ dynes/$cm^2$ at 25° C. and 1.2×$10^9$ dynes/$cm^2$ at 50° C.; the integral of log tan δ was 27.7 from about −40° C. to about 40° C. The ink displayed a phase change transition of about 93° C. by the technique of differential scanning calorimetry (DSC) using a TA Instrument DSC 2910 Modulated DSC.

EXAMPLE 5

A clear ink unshaded with any colorant system was prepared according to the following procedure and used to obtain the dynamic range in optical densities when employed in an ink jet printer with black shaded low, medium, and high optical density inks. A plasticizer[1] (207.9 grams) and molten stearyl stearamide[2] (1169.7 grams), and an antioxidant[3] (5.4 grams) were added (in that order) to a pre-heated 110° C. stainless steel container. The components were then mixed with a propeller mixer and a rosin ester resin[4] (711.0 grams) was slowly added to the mixture over 20 minutes, maintaining a mixture temperature of at least 100° C. A dimer acid-based tetra-amide[5] (605.8 grams) was then added to the mixture over 15 minutes, while also maintaining a minimum mixture temperature of 100° C. The blend was allowed to mix for 1 hour until all the tetra-amide had dissolved. The clear ink was then passed through a 2.0 micron filter (Pall Filter P/N PFY1U2-20ZJ, S/N 416) under approximately 5 psi of nitrogen pressure.

[1] SANTICIZER 278, phthalate ester plasticizer manufactured by Monsanto Polymer Products Co. of St. Louis, Mo.
[2] KEMAMIDE S-180, stearyl stearamide manufactured by Witco Chemical Company of Memphis, Tenn.
[3] NAUGARD 445, antioxidant manufactured by Uniroyal Chemical Company of Middlebury, Conn.
[4] KE-100, glycerol ester of hydrogenated abictic (rosin) acid manufactured by Arakawa Chemical Industries Inc. of Osaka, Japan
5 UNIREZ 2970, manufactured by Union Camp Corporation of Wayne, N.J.

The viscosity of the clear ink was found to be 12.79 centipoise at 140° C. measured with a Bohlin Model CS-50 Rheometer CS-50 using a cup and bob geometry. Dynamic mechanical analyses (DMA) were used on a Rheometrics Solids Analyzer (RSA II) manufactured by Rheometrics, Inc. of Piscataway, N.J. using a dual cantilever beam geometry to determine the following physical properties: glass transition temperature ($T_g$)=11.1° C.; storage modulus E'=2.1×$10^9$ dynes/$cm^2$ at 25° C. and 1.1×$10^9$ dynes/$cm^2$ at 50° C.; the integral of log tan δ was 27.0 from about −40° C. to about 40° C. The ink displayed a phase change transition of about 94° C. by the technique of differential scanning calorimetry (DSC) using a TA Instrument DSC 2910 Modulated DSC.

The following procedure was used to obtain the visible absorbance spectra of the ink samples in the Examples.

A solution of the orange shaded black ink was prepared by weighing about 0.16211 grams of the ink of Example 1 and graphically illustrated in FIG. 5 into a 250 mL volumetric flask. The ink was dissolved in n-butanol. When the ink was completely dissolved, the volumetric flask was filled to volume with n-butanol. The solution was thoroughly mixed. The absorbance spectrum of the sample was measured against a reference cell containing the solvent, n-butanol, in a dual beam Perkin-Elmer Lambda 2S UV-Visible Spectrometer scanning from 350 nm to 750 nm. The absorbances at 580 nm and 475 nm were used to calculate the actual amounts of the two dyes incorporated into the ink after filtering.

Compatibility Testing

The black and orange dyes from Examples 1–4 were found to be mutually compatible when used in a Tektronix Phaser®350 printer with a modified print head in which the cyan, yellow, magenta and black colors were replaced by the clear, low, medium and high optical density inks of Examples 5, 4, 3 and 2, respectively and were applied to a transparent polyethylene terephthalate substrate that was coated with the aforedescribed surface roughened adhesion promoting coating having a binder and an inorganic material. No clogging of any of the orifices of the ink jet print head was observed, even with multiple purging/wiping cycles in the printer or even with extended dwell time of the test inks in the printers. The resulting output permitted excellent transmission o light and high quality images to be printed with high resolution and sharp contrast between non-imaged and imaged areas.

No reaction occurred among these inks and no precipitates were formed in the inks on or around the print head surface during multiple normal purging cycles while the printer was in operation.

While the invention has been described above with references to specific embodiments thereof, it is apparent that many changes, modifications and variations in the materials, arrangements of parts and steps can be made without departing from the inventive concept disclosed herein. For example, in employing the present invention, all white pixels in a bitmap could be printed out or outputted as clear ink or as the lightest level of gray ink drops used.

Accordingly, the spirit and broad scope of the appended claims is intended to embrace all such changes, modifications and variations that may occur to one of skill in the art upon a reading of the disclosure. For example, it is possible that the aspect of the invention relating to preventing ink dot gain or dot spread and enhancing contrast between imaged and non-imaged areas could equally well be applied to electrophotography where toner is used to create the imaged areas. Since the charge control agents and resin employed in toners are clear, it is possible to use a clear toner to contain the toner-formed image in electrophotography in a similar way to that employed with solid ink to reduce dot gain and enhance contrast. All patent applications, patents and other publications cited herein are incorporated by reference in their entirety.

Having thus described the invention, what is claimed is:

1. A method of printing employing a phase change ink in an ink jet printer, the printer having a print head within multiple orifices through which ink drops are ejected onto a roughened receiving surface of an adhesion promoting coating applied over a transparent substrate to form imaged areas and non-imaged areas, the ink drops having multiple levels of black, the method of comprising the steps of:

a) forming at least one imaged area on the roughened receiving surface with the ink drops having multiple levels of black ranging from a lightest level of black to a darkest level of black, the imaged area being bordered by non-imaged areas;

b) covering the non-imaged areas with a clear or slightly tinted wax ink base by applying clear or slightly tinted ink drops in the non-imaged areas adjacent the imaged areas to prevent the scattering of light transmitted through the adhesion promoting coating and the transparent substrate; and c) fusing the imaged area and the non-imaged areas to the roughened receiving surface.

2. The method according to claim 1 further comprising the roughened surface of the receiving surface of the adhesion promoting coating having a root mean square surface roughness of greater than about 0.5 micrometers measured in any scanning direction.

3. The method according to claim 2 further comprising the adhesion promoting coating being a polymer binder and inorganic silica particulate material.

4. The method according to claim 2 further comprising the transparent substrate being a polyester film.

5. The method according to claim 3, further comprising the multiple levels of black ranging from a black to a light gray.

6. The method according to claim 5, further comprising the lightest level of black ink drops being light gray ink drops.

7. The method according to claim 1, further comprising the method being direct printing onto a final receiving surface.

8. The method according to claim 1, further comprising the method being indirect printing onto an intermediate transfer surface and then to a final receiving surface.

9. A transparency for use in medical diagnostic imaging applications, comprising in combination:

a) a transparent substrate;

b) an adhesion promoting coating applied to the transparent substrate, the coating having a exposed roughened surface with a root mean square surface roughness of greater than about 0.5 micrometers; and c) imaged and non-imaged areas formed by ink jetted phase change ink onto the exposed roughened surface of the adhesion promoting coating, the imaged areas being formed from a plurality of gray scale levels of black ink and the non-imaged areas being coated with a clear or slightly tinted wax base on top of the adhesion promoting coating.

10. The transparency according to claim 9 further comprising the adhesion promoting coating being a polymer binder and silica inorganic particulate material.

11. The transparency according to claim 10 further comprising the transparent substrate being a polyester film.

* * * * *